US012414208B2

(12) United States Patent
Sterz et al.

(10) Patent No.: US 12,414,208 B2
(45) Date of Patent: Sep. 9, 2025

(54) DOMESTIC MICROWAVE DEVICE WITH ROTARY ANTENNA

(71) Applicant: BSH Hausgeräte GmbH, Munich (DE)

(72) Inventors: Sebastian Sterz, Großaitingen (DE); Markus Kuchler, Gstadt am Chiemsee (DE); Kerstin Rigorth, Mühldorf (DE); Matthias Vogt, Obersulm (DE)

(73) Assignee: BSH Hausgeräte GmbH, Munich (DE)

( * ) Notice: Subject to any disclaimer, the term of this patent is extended or adjusted under 35 U.S.C. 154(b) by 861 days.

(21) Appl. No.: 17/609,798

(22) PCT Filed: Jun. 18, 2020

(86) PCT No.: PCT/EP2020/066924

§ 371 (c)(1),
(2) Date: Nov. 9, 2021

(87) PCT Pub. No.: WO2020/260123

PCT Pub. Date: Dec. 30, 2020

(65) Prior Publication Data

US 2022/0225477 A1 Jul. 14, 2022

(30) Foreign Application Priority Data

Jun. 24, 2019 (DE) ..................... 10 2019 209 074.5

(51) Int. Cl.
*H05B 6/72* (2006.01)

(52) U.S. Cl.
CPC .................................... *H05B 6/725* (2013.01)

(58) Field of Classification Search
CPC ........... H05B 6/725; H05B 6/74; H05B 6/745
USPC .......................................................... 219/749
See application file for complete search history.

(56) References Cited

U.S. PATENT DOCUMENTS 3,692,967 A * 9/1972 Hashimura .............. H05B 6/74 219/751
4,556,772 A * 12/1985 McCammon .......... H05B 6/725 219/757
4,629,849 A 12/1986 Mizutani
6,274,859 B1 * 8/2001 Yoshino ............... H05B 6/6411 219/749
7,145,119 B1 12/2006 Kim
2018/0359822 A1 12/2018 Mazzon

FOREIGN PATENT DOCUMENTS

CN 1558146 A 12/2004
CN 105509108 A 4/2016
CN 206004937 U 3/2017

(Continued)

OTHER PUBLICATIONS

English Translate JP2011202868 (Year: 2011).*

(Continued)

*Primary Examiner* — Chris Q Liu
*Assistant Examiner* — James F Sims, III
(74) *Attorney, Agent, or Firm* — Michael E. Tschupp; Andre Pallapies; Brandon G. Braun

(57) ABSTRACT

A household microwave appliance includes a rotary antenna having a plurality of wings rotatable about a common axis of rotation, with a relative angle between at least two of the plurality of wings being adjustable in a motor-driven manner about the axis of rotation.

20 Claims, 5 Drawing Sheets

(56) References Cited

FOREIGN PATENT DOCUMENTS

| | | | |
|---|---|---|---|
| DE | 102014109730 | A1 | 1/2016 |
| DE | 102014114164 | A1 | 3/2016 |
| EP | 1083772 | A1 | 3/2001 |
| JP | 2002110339 | A | 4/2002 |
| JP | 2011202868 | A | 10/2011 |
| WO | 2012114369 | A1 | 8/2012 |

OTHER PUBLICATIONS

International Search Report PCT/EP2020/066924 dated Sep. 4, 2020.

National Search Report CN 202080046080.8 dated Jan. 12, 2024.

* cited by examiner

DOMESTIC MICROWAVE DEVICE WITH ROTARY ANTENNA

CROSS-REFERENCES TO RELATED APPLICATIONS

This application is the U.S. National Stage of International Application No. PCT/EP2020/066924, filed Jun. 18, 2020, which designated the United States and has been published as International Publication No. WO 2020/260123A1 and which claims the priority of German Patent Application, Serial No. 10 2019 209 074.5, filed Jun. 24, 2019, pursuant to 35 U.S.C. 119 (a)-(d).

The contents of International Application No. PCT/EP2020/066924 and German Patent Application, Serial No. 10 2019 209 074.5 are incorporated herein by reference in their entireties as if fully set forth herein.

BACKGROUND OF THE INVENTION

The invention relates to a household microwave appliance, having a rotary antenna with at least two wings rotatable about a common axis of rotation. The invention also relates to a method for operating a household microwave appliance, which is equipped with a rotary antenna having at least two wings. The invention can be applied particularly advantageously to cooking appliances with a microwave function.

U.S. Pat. No. 7,145,119 B1 discloses a microwave oven, which has a housing with a cooking chamber, a microwave source for generating microwaves, a wave guide for guiding the microwaves generated by the microwave source into the cooking chamber, a rotary antenna which can be rotated by means of a drive motor for emitting the microwaves guided in the wave guide into the cooking chamber and a moveable agitator, which is coupled to the rotary antenna, in order to work together with the rotary antenna.

EP 3 177 109 A1 discloses a microwave oven, in particular for a household appliance. The microwave oven has a cooking chamber, which is enclosed at least partially by a cooking chamber wall. The microwave oven comprises a microwave generator, in particular a magnetron, which is arranged outside of the oven cavity. At least one antenna extension is arranged inside of the cooking chamber. The antenna extension penetrates through an opening in the cooking chamber wall. The antenna extension is connected electrically to the magnetron antenna.

CN 206004937 U discloses an antenna module and a microwave oven, wherein the antenna module comprises the following: a base plate, a first antenna pole, which is fastened to the base plate. At least one second antenna pole runs in the axial direction through the first antenna pole, wherein the at least one second antenna pole is fastened to the base plate, an end thereof runs through the base plate and a semiconductor microwave source, and the other end of each second antenna pole is connected electrically.

WO 2012/114369 A1 discloses a high frequency heating apparatus, which is able to uniformly irradiate high frequency waves, which are oscillated by a high frequency oscillator, into a heating chamber. An antenna of the high frequency heating apparatus is equipped with: slot antennas, which use slot openings, which are generated on conductor sections as first radiation sections, which are connected to an antenna shaft; conduction paths, which are branched from the first radiation sections; and a second antenna, which uses an antenna plate, which is connected to the conduction paths, as a second emission section.

CN 105509108 A discloses a microwave oven for cooking food. The microwave oven comprises a housing, a cylindrical oven chamber arranged in the housing, an electrical appliance chamber, a magnetron, an L-shaped wave guide pipe with a vertical wave guide pipe and a horizontal, rectangular wave guide pipe with a wave guide outlet, a helical antenna, a microwave reflector, a power supply, a fan, a printed circuit board, an oven door and a printed circuit board, which are provided with control button, wherein the magnetron and the L-shaped wave guide pipe are arranged in the electrical appliance chamber. The microwave oven uses a cylindrical oven chamber, so that eight useless energy storage blind spots of conventional rectangular oven chambers are eliminated. The circularly polarizing helical antenna is used as a microwave emitter, wherein a rotational speed of the helical antenna corresponds to an operating frequency of the magnetron.

DE 10 2014 109 730 A1 discloses a household appliance, in particular cooking appliance, which comprises a microwave source and a treatment chamber and a distribution facility for the targeted distribution of microwave radiation in the treatment chamber. Here the distribution facility for sending the microwave radiation into the treatment chamber has at least one sending facility with at least one exterior embodied in a rotationally symmetrical manner.

EP 0 166 622 B1 discloses a microwave heating appliance for heating up a product to be heated in a heating chamber by means of microwave radiation, which is generated by a microwave oscillator, with an external wave guide for directing the microwave radiation from the microwave oscillator into the heating chamber, wherein at one of its ends the outer wave guide has an outlet to the heating chamber, and a reflector facility arranged in the vicinity of the outlet from the outer wave guide, for distributing the microwave radiation in the heating chamber, wherein the reflector facility comprises a rotating reflector part, which can be rotated about the axis of the outlet by the external wave guide, characterized in that the reflector facility has one or more reflection surfaces, inclined with respect to the axis of the outlet, for reflecting the microwave radiation, the heating appliance comprises a drive apparatus for rotationally driving the rotating reflector facility, so that the direction of the reflection of the microwave radiation can be changed in the chamber, which results in an irregular reflection and uniform distribution of the microwaves within the chamber.

Microwave ovens with separately arranged and driven rotary antennas are also known, wherein an angular position of the rotary antennas can be adjusted individually.

BRIEF SUMMARY OF THE INVENTION

It is the object of the present invention to overcome the disadvantages of the prior art at least partially and in particular to provide a possibility which can be implemented in a compact and structurally simple manner in order to set a microwave distribution in a cooking chamber in a versatile manner.

This object is achieved according to the features of the independent claims. Advantageous embodiments form the subject matter of the dependent claims, the description and the drawings.

The object is achieved by a household microwave appliance, having a rotary antenna with at least two wings (also known as blades) rotatable about a common axis of rotation, wherein a relative angle between at least two of these wings is adjustable in a motor-driven fashion about the common axis of rotation.

As a result, the advantage is achieved that a high number of microwave field distributions can be targetedly excited and selected within a cooking chamber of the household microwave appliance with minimal structural outlay and a minimal space requirement. As a result, high uniformity or alternatively a targeted irregularity can in turn be reached when food to be cooked is heated. The high number of field distributions which can be set in different manners is then particularly advantageous if specific sequences of field distributions or antenna positions are selected in order to generate desired heating patterns. The present rotary antenna is therefore in particular adjustable in a motor-driven manner so that an angular position of its wings in the space (in particular in respect of the cooking chamber) and also a relative angular position of at least two wings with respect to one another can be adjusted.

The household microwave appliance can be a cooking appliance, a dish disinfection appliance etc. If the household microwave appliance is a cooking appliance, it can be as an oven, a standalone microwave oven or a combination thereof, such as an oven with microwave function or a microwave oven with additional IR emitters.

In one development, the household microwave appliance has a treatment chamber which can be closed by means of a particularly microwave-tight door and can be exposed to microwaves. The microwaves can be generated by means of a microwave generator, which can be embodied for instance as a magnetron or a semiconductor-based microwave generator. In one development, the microwave generator has an inverter or is an inverter-controlled microwave generator. In the case of a cooking appliance, the treatment chamber can also be referred to as the cooking chamber.

The microwaves are coupled into the treatment chamber with the aid of the rotary antenna, wherein a field distribution of the microwaves in the treatment chamber is determined to a great extent by the angular position of its respective wings. In particular, the field distribution can be adjusted or set by selecting the angular position(s). To this end the wings are typically embodied to be electrically conductive, e.g. they thus consist at least in part of an electrically conductive material such as metal or electrically conductive ceramic.

In one development, the microwave generator is connected in terms of microwave technology to the rotary antenna by way of a microwave guide. Here the microwaves generated by the microwave generator are routed by means of the microwave guide to the rotary antenna, by means of which they are coupled out in the direction of the treatment chamber. The microwave guide can be a hollow conductor, for instance.

In one development, at least one of the wings of the rotary antenna is connected in terms of microwave technology to the hollow conductor. As a result, the microwaves present in the hollow conductor can be routed to this wing (which can also be referred to as energy or power coupling). In one development, all wings of the rotary antenna are connected via microwave technology to the hollow conductor. In one development, at least one of the wings is not connected to the hollow conductor in terms of microwave technology or is separated from the hollow conductor in terms of microwave technology. A microwave connection between the microwave guide and a wing can be implemented such that the wing is connected to an electrical conductor, which reaches or projects into the microwave guide.

In one development, at least two wings are connected electrically with one another. They are then also connected with one another in terms of microwave technology.

In one development, at least two wings are separated or isolated from one another electrically. They can then also be separated from one another in terms of microwave technology or connected to one another in terms of microwave technology, e.g. by capacitive coupling.

A wing can have basically any shape. At least one wing can therefore be molded as a single segment of a circle, a segment of a circle with punched hole(s), as a rod or in a spatially curved manner. A wing can be embodied as a single wing or a multi-wing (e.g. as a double wing with two wing elements or wing regions etc.). In particular, all wing elements or wing regions which are present on a common rotatable wing axis can be considered to be parts of a wing.

An axis of rotation is understood to mean in particular a notional straight line, which defines or describes a rotation or turn. A relative angular position or a relative angle can be understood to mean in particular an angular distance or differential angle of the at least two wings about the common axis of rotation. An absolute angular position or an absolute angle of the rotary antenna can be understood to be an angular position of any, but then fixedly selected wing in respect of the cooking chamber or an angular position of an acentric wing axis with respect to the common axis of rotation.

In one development, each of the wings is connected to a drive motor for its rotatability about a respective axis or respective shaft (referred to below as "wing axis"). The drive motor can be an electric motor, for instance a stepper motor. In general each wing axis can be assigned a respective drive motor. Alternatively, a number of wing axes can be driven by means of the same motor.

The wing axes can run at least partially through the microwave guide. They can be held rotatably on the microwave guide.

In one embodiment, the rotary antenna has precisely two wings. A versatile setting of a field distribution is advantageously enabled in the treatment space with a structurally particularly low outlay. However, the rotary antenna can also have three or more wings which can be angularly adjusted relative to one another.

In one embodiment, at least two wings or their wing axes can be rotated independently of one another. The advantage is therefore achieved that the absolute angle and the relative angle of the wings can be adjusted in a particularly versatile manner. One development which is particularly advantageous for this embodiment is that each of the wings which can be moved relative to one another can be rotated by a respective motor.

In one embodiment, at least two wings have wing axes which are arranged coaxially with respect to one another or can be rotated by way of wing axes which are arranged coaxially with respect to one another. This enables a structurally particularly simple and compact design, particularly in the case that the rotary antenna has precisely two wings. In one development, a first straight wing axis of a first wing is arranged to be coaxially rotatable in a second straight wing axis, embodied as a pipe or sleeve, of a second wing. In one development, the two wing axes can be rotated independently of one another.

In one embodiment, the wing axes of two wings are connected rotatably to one another by way of a rotary ratchet mechanism (which can also be referred to as a locking mechanism or safety catch mechanism). When a motor-driven wing axis (drive axis) is turned in a first direction of rotation, the rotary ratchet causes the other wing axis to be carried along, in particular at the same speed of rotation or angular speed. If the driven wing axis moves in the reverse second direction of rotation, however, its rotational movement is not transferred to the other wing axis. The use of a rotary ratchet is advantageous in that a setting of the position of both wings in the space and the relative angle with respect to one another is enabled by means of a motor-driven drive of just one of the wing axes. In other words, the absolute and relative angular position of both wings can be easily set by means of just one drive motor. In this regard it is basically irrelevant which of the two wing axes is the drive axis and which is the driven axis. Therefore with a coaxial arrangement of the wing axes, the outer wing axis or the inner wing axis can be designed as a drive axis.

In one embodiment, at least two wings or wing axes can be rotated or driven by means of the same motor by way of a transmission. As a result, the advantage is achieved that a number of wings can be driven by means of a single motor and, depending on the embodiment of the transmission, for instance its axis-dependent gear ratio, can also be rotated with a different angular speed.

In one embodiment, a wing has a stop for another wing. The advantage is therefore achieved that these two wings at least come into mechanical contact with one another. As a result, a specific relative angle (also referred to below as the zero, park or rest position) between the two wings can be defined or set mechanically in a particularly accurate manner.

In one development, the stop can advantageously be used to set an absolute angular position of the wings with respect to the cooking chamber and a relative angular position of the wings in respect of one another (i.e. the relative angle) by means of a single motor or a single driven wing axis or wing. This is because the other wing, if it is in contact with the driven wing, is carried along with the driven wing, while the relative angle between the two wings can be adjusted in the reverse direction of rotation by the following rotation of the driven wing. However, the stop can also be provided with two wings which are driven independently of one another.

A further advantage of providing the stop can consist in an electrical contacting of the two wings if the stop establishes an electrical connection between them. To this end, in one embodiment, it can be embodied as an electrically conductive stop. This is advantageous in that a spark discharge can be prevented between the two wings, which are then typically close to one another. This is particularly advantageous if the rotary antenna with the wings is used in its park position to irradiate high microwave power into the cooking chamber.

In one development, at least two of the wings which can be angularly adjusted relative to one another, especially all wings, are arranged or "stacked" at a distance along the axis of rotation. In this way, the advantage is achieved that particularly versatile field distributions can be set in the cooking chamber with a compact design of the rotary antenna and can further be easily ensured that the wings do not unintentionally mutually block one another in terms of their rotation.

In one embodiment, a height of at least two wings can be adjusted in a motor-driven manner along the axis of rotation. A further parameter is advantageously provided, in order to vary a field distribution in the cooking chamber, wherein a compact design of the rotary antenna can advantageously be retained in order to implement this embodiment. In one embodiment, in addition or alternatively, a distance between at least two wings can be adjusted in a motor-driven manner along the axis of rotation. A field distribution in the cooking chamber can thus be varied in a particularly versatile manner.

In one embodiment, the rotary antenna has two wings with coaxially arranged wing axes, each of which has an electrically conductive section connected in terms of microwave technology to the wings, which projects into a part of a microwave guide, wherein the electrically conductive section of the outer wing axis is embodied as a lateral shield for a corresponding electrically conductive section of the inner wing axis and the electrically conductive section of the inner wing axis within the wave guide projects or protrudes beyond the electrically conductive section of the outer wing axis. As a result, a separate energy or power coupling of microwaves into the wing axes and thus into the wings connected with the wing axes in terms of microwave technology is advantageously enabled in a particularly compact manner. The intensity of the power coupling into the wing axes is determined here by the length of the projection, e.g. based on what is known as the "Balun effect".

In the case that the distance of the two wings along the axis of rotation can be adjusted in a motor-driven manner, the length of the projection and thus advantageously the intensity of the power coupling of microwaves into the inner wing axis can thus be targetedly set because to this end the wing axes are displaced lengthways relative to one another. In one embodiment, a length of a projection of the electrically conducting section of the inner wing axis from the electrically conducting section of the outer wing axis can thus be adjusted by adjusting the distance between the two wings along the axis of rotation. In one development, the inner wing axis can be included completely in the outer wing axis, wherein the length of the projection is or will be zero.

This embodiment can be extended analogously to three or even more wings with coaxial wing axes.

The object is also achieved by a method for operating a household microwave appliance, which is equipped with a rotary antenna with at least two wings, wherein during operation of the household microwave appliance, a relative angle between at least two of the wings relative to one another is adjusted in a motor-driven manner. The method can be embodied similarly to the household microwave appliance and has the same advantages.

In one embodiment, the absolute angle and/or the relative angle is or are set on the basis of a specification or determination of a product to be treated with microwaves;

a distribution of a temperature and/or a degree of browning on a surface of a product to be treated with microwaves;

a strength of back-scattered microwaves; and/or a value of one or more operating parameters.

As a result, a field distribution can advantageously be adjusted to different operating states, types of microwave-treated product (in particular food to be cooked) etc.

BRIEF DESCRIPTION OF THE DRAWINGS

The afore-described properties, features and advantages of this invention and the manner in which these are achieved will become clearer and more intelligible in conjunction with the following schematic description of an exemplary embodiment which is explained in more detail in conjunction with the drawings.

DETAILED DESCRIPTION OF EXEMPLARY EMBODIMENTS OF THE PRESENT INVENTION

Figure 1:
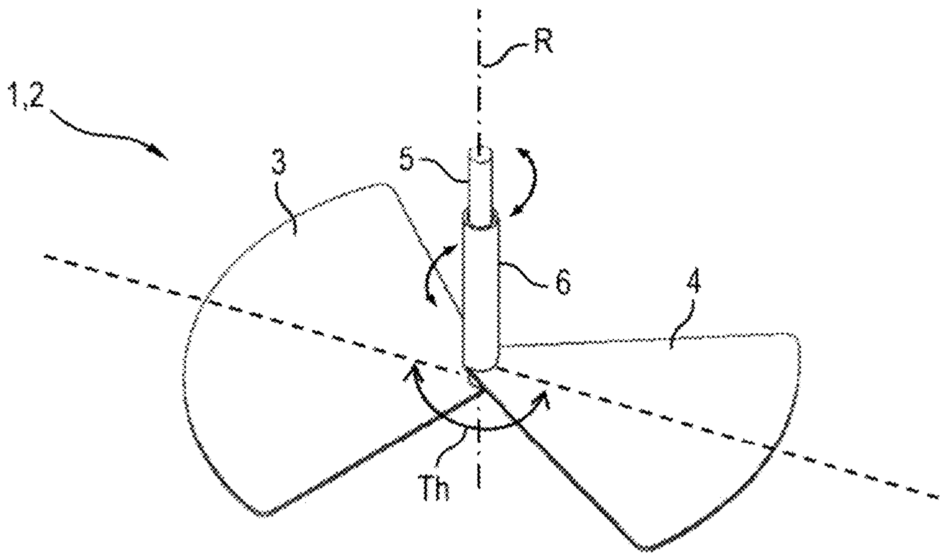
FIG. 1 shows an oblique view of a rotary antenna according to a first exemplary embodiment.
Figure 2A:
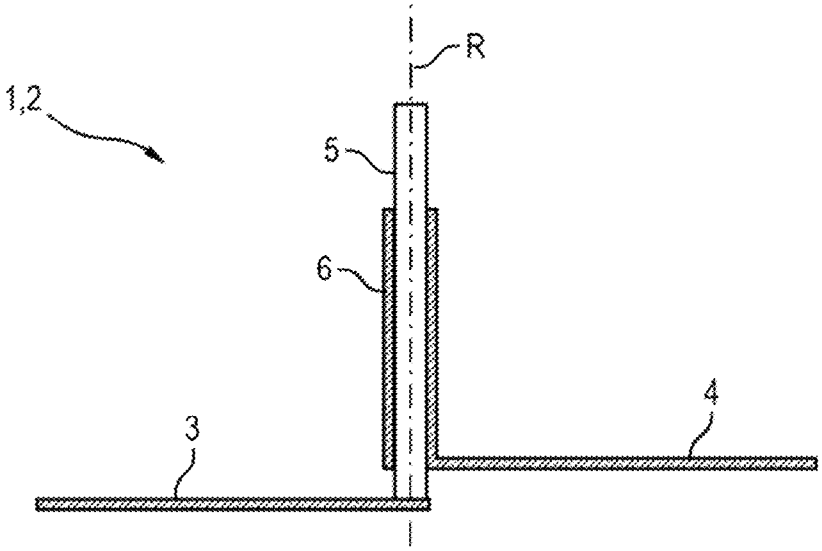
FIG. 2A shows a sectional representation in the side view into the rotary antenna according to the first exemplary embodiment.

FIG. 1 shows an oblique view of a rotary antenna 2 of a microwave household appliance 1 in the form e.g. of an oven with additional microwave function. The rotary antenna 2 has a first “lower” or “front” wing 3 and a second “upper” or “rear” wing 4, which consist in each case of electrically conductive material such as metal. FIG. 2A shows the rotary antenna 2 as a sectional representation in a side view.

The first wing 3 projects radially from a cylindrical, inner wing axis 5, while the second wing 4 projects radially from a hollow cylinder-shaped or sleeve-shaped, outer wing axis 6. The two wing axes 5 and 6 are arranged coaxially relative to one another, wherein the inner wing axis 5 is arranged rotatably in the outer wing axis 6. Both wings 3 and 4 can therefore be rotated about the same axis of rotation R, as indicated by the double arrows. The two wings 3 and 4 are arranged at a distance from one another along the axis of rotation R.

The wing axes 5 and 6 can project into or through a microwave guide 52 (see FIG. 8) embodied as a hollow body. A variant in which the inner wing axis 5 is embodied from electrically non-conductive, temperature-resistant and low-loss microwave ceramic is shown. The outer wing axis 6 preferably consists of metal, in order to be able to couple microwave energy out from the hollow conductor.

In particular, a relative angle Th of the two wings 3 and 4 relative to one another can be set by independent rotation of the wing axes 5 and 6. A relative angular position of the wings 3 and 4 is shown with a relative angle Th of approx. 180° (in which the wings 3 and 4 are arranged facing away from one another), with a view along the axis of rotation R. The relative angle Th is determined here in respect of the wing centers, but can however also use any other suitable reference point of the wings 3, 4.

The two wings 3, 4 can be moved simultaneously at the same angular speed in the same direction of rotation about the axis of rotation R, as a result of which their relative angle Th is retained but their position or their absolute angle in the space changes. The two wings 3, 4 can however also be moved simultaneously with a different angular speed in the same direction of rotation about the axis of rotation R or in the opposite direction of rotation, as a result of which their relative angle Th changes with respect to one another. It is also possible to rotate just one of the wings 3 or 4 during a duration. The wings can also remain stationary during a duration.

The relative angle Th and/or the absolute angle (including an angular position without adjusting the relative angle Th) of the wings 3, 4 can be selected automatically, for instance, on the basis of a specification or determination of a product to be treated with microwaves;

a distribution of a temperature and/or a degree of browning on a surface of a product to be treated with microwaves;

a strength of backscattered microwaves;

a value of one or more operating parameters.

This also involves the possibility of adjusting specific sequences of angles of rotation or rotational positions of the wings 3, 4, in particular on the basis of the above criteria.

Both wings 3 and 4 here have a circular sector shape, in each case, but possibly with a different radius and/or different angular width.

In one variant, the wing axes 5 and 6 are connected for their rotation with respective drive motors (top fig.). As a result, the angular positions of both wing axes 5 and 6 and thus the wings 3 or 5 connected fixedly or rigidly therewith about the axis of rotation R can be selected individually and completely freely.

Figure 2B:
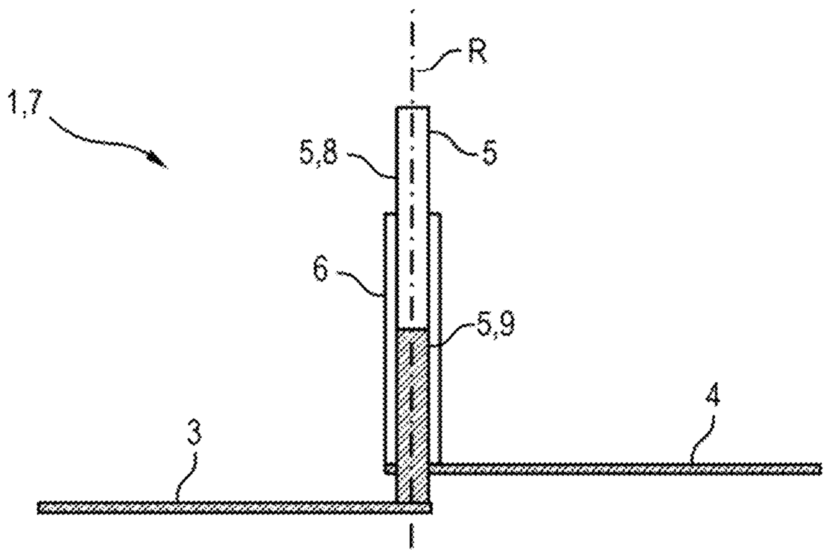
FIG. 2B shows a sectional representation in the side view into the rotary antenna according to a second exemplary embodiment.

FIG. 2B shows a sectional representation in the side view of a rotary antenna 7. The rotary antenna 7 is designed similarly to the rotary antenna 2, wherein only a rear section 8 of the inner wing axis 5 is however embodied from electrically non-conductive material, in particular from electrically non-conductive, temperature-resistant and low-loss microwave ceramic. A front section 9 of the inner wing axis 5, connected to the front wing 3, conversely consists of electrically conductive material such as stainless steel, copper or suchlike. The outer wing axis 6 now consists entirely of electrically non-conductive material.

The energy is coupled out in the rotary antenna 7 by way of the electrically conductive section 9 of the inner wing axis 5. In this regard the rear wing 4 can optionally be connected in an electrically conducting manner with the electrically conductive section 9, for instance by way of a sliding contact. The advantage of this exemplary embodiment consists especially in that the diameter of the wing axes 5, 6 can in practice be reduced with the same effect in relation to the rotary antenna 2. On account of the reduced diameter of the axis 5, 6 channeling out the microwaves, a distance from a hollow conductor wall and hollow conductor feedthrough can in turn be increased in the direction of the cooking chamber 54 (see FIG. 8). This reduces the risk of spark discharges.

Figure 3:
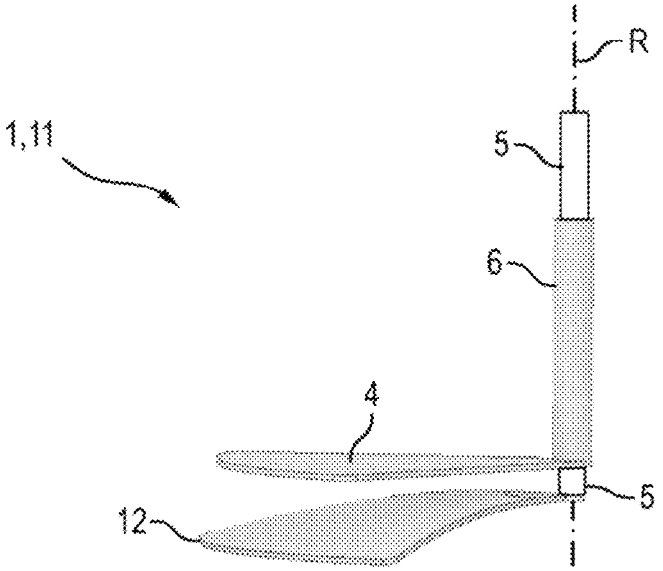
FIG. 3 shows an oblique view of a rotary antenna according to a third exemplary embodiment.

FIG. 3 shows an oblique view of a rotary antenna 11, which can be installed in the microwave household appliance 1 instead of the rotary antenna 2. The rotary antenna 11 is embodied similarly to the rotary antenna 2, but the front wing 12 now does not have the shape of a flat circular sector, but instead a spherical shell segment which bends forward or away from the rear wing 4. As a result, the two wings 12 and 4 with a larger distance from the axis of rotation R have a greater distance than the wings 3 and 4, which reduces the risk of a spark discharge.

Figure 4:
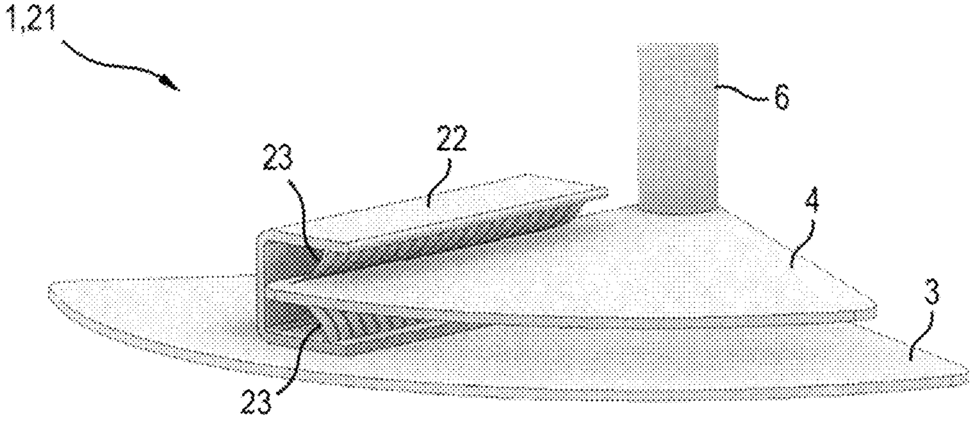
FIG. 4 shows an oblique view of a cutout from a rotary antenna according to a fourth exemplary embodiment.

FIG. 4 shows an oblique view of a cutout from a rotary antenna 21, which can be installed in the microwave household appliance 1 instead of the rotary antenna 2. The rotary antenna 21 is embodied similarly to the rotary antenna 2, wherein a stop piece or stop 22 for the rear wing 4 is now present on the flat side of the front wing 3 which faces the rear wing 4.

If the rear wing 4 is located as far as the stop with the stop 22, this can be defined as a relative angle Th=0°, which corresponds to a zero or rest position. By way of example, in the rest position, the rear wing 4 is covered completely by the front wing 3. As a result, a particularly high energy output into a cooking chamber 54 (see FIG. 8) and thus a product located in the cooking chamber 58 is enabled. This is particularly advantageous if the product to which microwaves are to be applied does not require a particularly uniform heating, e.g. in the case of a presence of liquid.

The stop 22 can be embodied to be electrically conductive, so that with mechanical contact with the rear wing 4, an electrical connection is also established between the two wings 3 and 4. To this end, electrically conductive contact springs 23 may be present on the stop 22. The electrical conductivity of the stop 22 is advantageous in that a particularly effective operating state is produced in the rest position for the microwave generator (top fig.), in particular for a magnetron, and furthermore the formation of sparks, for instance between the wings 3 and 4, is prevented.

In this exemplary embodiment, the inner wing axis 5 can be driven in a motor-driven manner, while the outer wing axis 6 or 5 is freely rotating. The stop 22 can be used to set the angular position also of the rear wing 4 by means of a single motor by rotating the inner wing axis 5 and thus the front wing 3. The rear wing 4 can then, if it is in contact with the driven front wing 3, be carried along with the front wing 3, whereas when the front wing 3 is subsequently rotated in the reverse direction of rotation, the rear wing 4 disengages from the stop 22 and only the front wing 3 is still rotated. Therefore the relative angle Th between the two wings 3, 4 and also the absolute angle can be targetedly adjusted.

However, the outer wing axis 6 can basically also be the motor-driven wing axis. Similarly it is possible for a rest position to consist of or be defined with another relative angle Th, e.g. with a relative angle Th of 180°.

A rest position or a corresponding relative angle Th can generally be selected so that upon its assumption a particularly high energy output into the cooking chamber is achieved, in particular to heat up liquid or another load, which does not require a particularly uniform heating. In particular, in this case, the maximum power can be called up.

In general, the rotary antenna can be embodied so that it is attuned to different operating states, in particular to operating states which are either adjusted in a targeted manner to a maximum energy output of the microwave generator, in particular a magnetron, or to an increased variability of field distributions in the cooking chamber. This is particularly advantageous for inverter microwave appliances, since an inverter can provide adjustable, constant output powers.

Generally, and thus also independently of the exemplary embodiments described here, the motor-driven adjustability of the relative angle between the wings about the axis of rotation can bring the rotary antenna into different angle configurations, which are adjusted to different applications. Therefore microwave energy or power with a high local energy or power concentration can be irradiated ("focused") into the cooking chamber, for instance, if the wings are arranged directly one above the other (e.g. corresponding to a relative angle Th=0°). This can be expressed for instance so that points in the cooking chamber, known as "hotspots" are generated at specific, in particular predetermined points. As a result, this makes it possible to targetedly locally introduce particularly high microwave energy into the cooking chamber at the points of the hotspot(s). If these hotspots are also arranged close to the axis of rotation, with a rotation of the rotary antenna as a whole (and with an angular rotation of both wings), high microwave energy is applied to only a comparatively limited spatial region of the cooking chamber. This can be particularly advantageous if liquid is to be heated. This is because a uniformity of the distribution of the microwave energy in the liquid only plays a subordinate role on account of its high thermal conductivity. It is particularly advantageous in this case if the hotspots are generated in a lower spatial region disposed close to the axis of rotation, e.g. a spatial region which corresponds to a content of a plate or glass of a typical depth. This configuration can also be referred to as "power configuration". It can be automatically set, for instance, if an application such as "Heat liquid", "Soup", "Hot beverage" inter alia is selected on the appliance.

If in contrast a high uniform distribution of the microwaves in the cooking chamber is to be achieved (e.g. by avoiding or sufficiently rapidly changing the position of the hotspot), the rotary antenna can be brought into other angular configurations, which are adjusted to such a purpose. Therefore if the wings face one another or are arranged facing away from one another in respect of the axis of rotation (e.g. according to a relative angle Th=180°), microwave energy or power with less, less significant and/or spatially further distributed hotspots, compared with Th=0°, can be irradiated into the cooking chamber. This can be advantageous e.g. for uniform heating of solid foods. With a rotation of the rotary antenna as such (about an absolute angle), the field distribution in the cooking chamber is then changed particularly significantly over time, so that a particularly uniform field distribution is produced in a temporally integrated manner.

In general, the relative angle Th can therefore be adjusted to a selected or identified food, type of dish or group of dishes.

Figure 5:
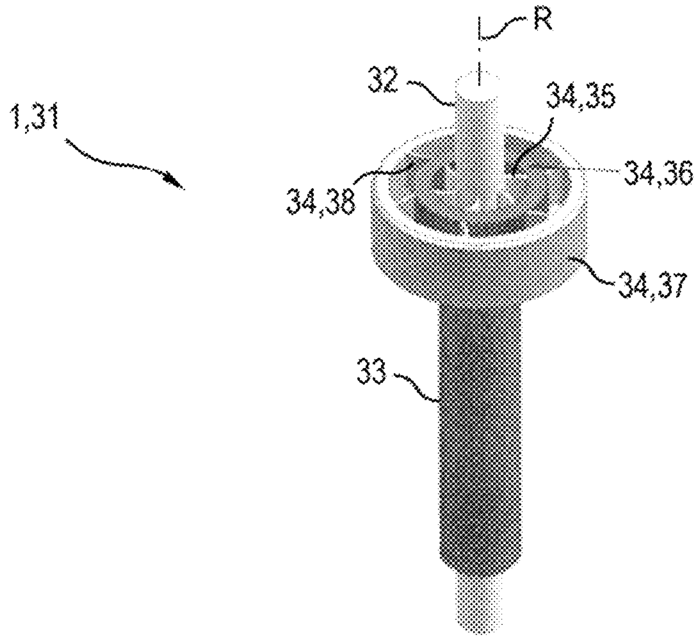
FIG. 5 shows an oblique view of wing axes of a rotary antenna according to a fifth exemplary embodiment.
Figure 6:
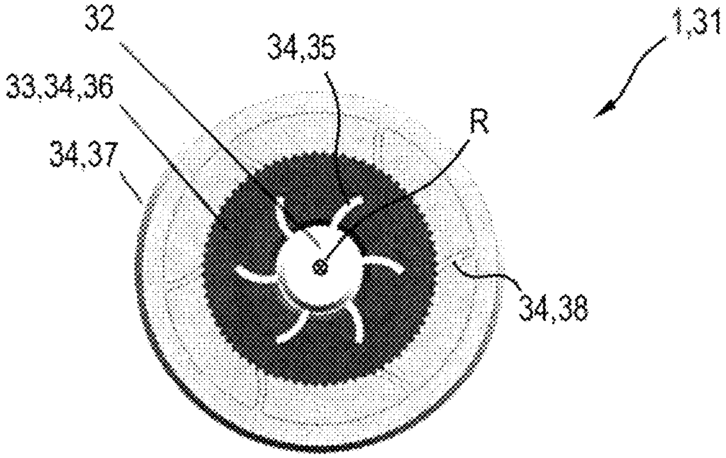
FIG. 6 shows a top view of the wing axes of the rotary antenna according to the fifth exemplary embodiment.

FIG. 5 shows an oblique view of the two wing axes 32 and 33 of a rotary antenna 31, which can be installed in the microwave household appliance 1 e.g. instead of the rotary antenna 2. FIG. 6 shows the wing axes of the rotary antenna 31 in a top view. The two wing axes 32 and 33 are embodied similarly to the wing axes 5 or 6, but are connected to one another by way of a rotary ratchet mechanism 34. The rotary ratchet mechanism 34 causes the wing axes 32 and 33 to be mechanically coupled so that in one direction of rotation only one wing axis 32 rotates with the associated wing, in the other direction however both wing axes 32 and 33. This is advantageous in that by providing just one drive motor, it is possible to set any value of the relative angle Th and the absolute angle of the wings 3, 4.

The rotary ratchet mechanism 34 is embodied so that on a longitudinal section the inner wing axis 32 has a number of radially projecting, curved latches 35, which engage in an inner toothed circle of a corresponding, circular ring-shaped longitudinal section 36 of the outer wing axis 33. This circular ring-shaped longitudinal section is surrounded by a sleeve or pipe-shaped, fixedly arranged body (e.g. rigidly attached to a housing). A number of radially projecting, curved latches 38, which engage into an outer toothed circle of the longitudinal section 36, move inward from the body.

When the inner antenna axis 32 is rotated in the clockwise direction (see in particular FIG. 6), the outer antenna axis 36 is carried out over the latches 35 by way of force transmission. In this process, the latches 38 yield and offer no or no noticeable resistance to counteract a movement of the outer antenna axis 36.

When the inner antenna axis 32 is rotated counterclockwise, conversely no force or no noticeable force is transmitted by way of the latches 35. Moreover, the latches 38 then block a rotational movement of the outer wing axis 33, and only the inner wing axis 32 rotates.

Figure 7:
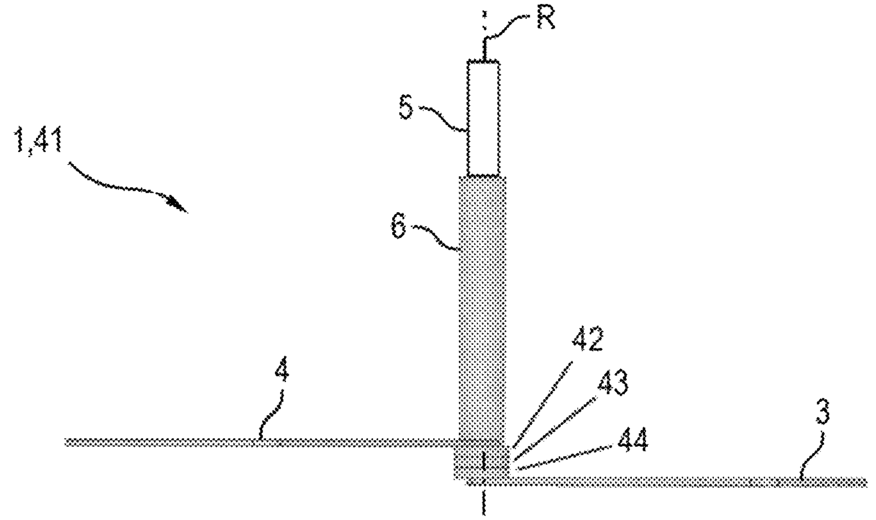
FIG. 7 shows a side view of a rotary antenna according to a sixth exemplary embodiment.

For instance, in the first two exemplary embodiments (see in particular FIG. 2), the wings 3, 4 or 12, 4 are separated electrically and in terms of microwave technology, since the inner wing axis 5 is embodied in one piece from an electrically non-conductive material. However, provision can advantageously be made for a permanent electrical connection to exist between the wings. To this end, FIG. 7 shows a side view of a rotary antenna 41, which can be installed in the microwave household appliance 1 instead of the rotary antenna 2, for instance.

The rotary antenna 41 is designed similarly to the rotary antenna 2, wherein the wings 3, 4 can now be connected to one another by way of an electrically conductive rotary bearing 42 to 44, embodied here in three pieces by way of example, e.g. a spherical bearing or sliding bearing.

Alternatively, a rotary bearing 42 to 44 can be provided, which maintains an electrical separation of the wings 3, 4, but enables a coupling in terms of microwave technology. To this end, the rotary bearing 42 to 33 can be embodied as a sliding bearing, for instance, wherein the upper element 42 and the lower element 44 are embodied to be electrically conductive and the middle element 43 is embodied to be electrically non-conducting. A capacitive coupling of microwave power between the elements 42 and 44 and thus also between the wings 3 and 4 is therefore enabled.

The middle element 43 advantageously has a minimal sliding friction and can consist of ceramic or PEEK, for instance.

The elements 42 and 44 can be molded in a ring or disk-shaped manner, for instance.

Figure 8:
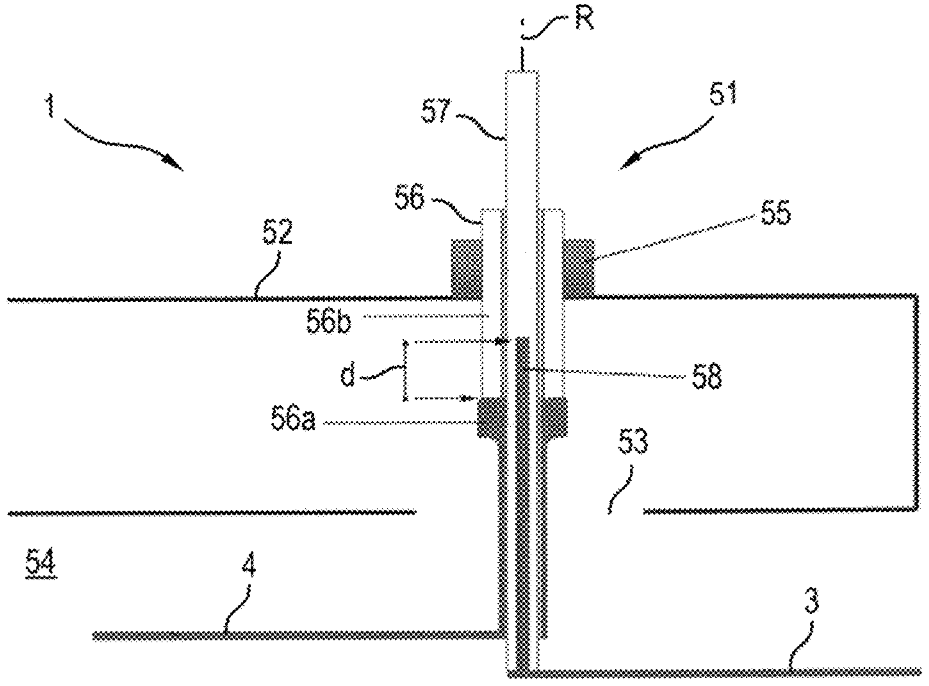
FIG. 8 shows a sectional representation in a side view of a cutout from a microwave household appliance with a rotary antenna according to a seventh exemplary embodiment.

FIG. 8 shows as a sectional representation in a side view a cutout from the microwave household appliance 1 with a rotary antenna 51, which runs through a microwave guide 52 embodied as a hollow conductor.

The rotary antenna 51 projects through an opening 53 in the microwave guide 52 into the cooking chamber 54 (or alternatively a corresponding front space), wherein the wings 3 and 5 are located in the cooking chamber 54. On the side facing away from the cooking chamber 54, the rotary antenna 51 projects through a further opening out from the microwave guide 52, and is surrounded there by a collar 55, e.g. in order to prevent microwaves from leaking.

An inner wing axis 57 arranged coaxially in respect of an outer wing axis 56 is arranged so as to be longitudinally displaceable in the outer wing axis 56, e.g. by means of a suitable adjustment mechanism (top fig.). The adjustment mechanism can have a motor or an actuator, e.g. an electric motor, piezo actuator etc. The adjustment mechanism can be used to move or displace the outer wing axis 56 and/or the inner wing axis 57 along the axis of rotation R depending on the structural design. In particular, the outer wing axis 56 and the inner wing axis 57 can be displaced individually longitudinally, as a result of which a height variation in the wings 3 and 4 is enabled both absolutely and also relatively to one another.

The at least one rotating facility, present above the collar 55, for rotating the wing axes 56 and 57 is also not shown.

The outer wing axis 56 has two different longitudinal sections 56*a* and 56*b*, namely a first longitudinal section 56*a* with or made from electrically conductive material, to which the rear wing 4 is fastened, and which projects into a part of the microwave guide 52. A second longitudinal section 56*b* made from electrically non-conductive or insulating material, which runs through the collar 55, is connected thereto in the microwave guide 52.

The inner wing axis 53 has an electrically conductive core 58 surrounded by electrically insulating material (e.g. a metallic wire or pin), which is connected electrically to the associated wing 3, and projects into the microwave guide 52. The core 58 protrudes with a projection of length d within the microwave guide 52 made from the first longitudinal section 56*a*, which is used as a lateral shield against microwave radiation.

This arrangement makes possible a separate energy or power coupling of the wings 3, 4 to the microwave fields present in the microwave guide 52, wherein energy is transported between the first longitudinal section 56*a* serving as an outer conductor and the core 58 serving as the inner conductor.

By means of the adjustment mechanism, the distance between the two wings 3 and 4 can be targetedly adjusted along the axis of rotation R. The length d changes analogously with the adjustment of the distance between the wings 3 and 4. This variant has the advantage that a height variation of the wings 3 and 4 is possible both absolutely and also relatively to one another, as a result of which, in turn, a particularly versatile variation of the field distribution within the cooking chamber 54 is enabled. In this regard, according to the so-called Balun effect, the length d determines the energy input onto the different wings 3, 4.

The present invention is naturally not restricted to the exemplary embodiments shown. Only rotary antennas which have two wings, the wing axes of which are arranged coaxially with respect to one another, are therefore described in the figures. However, an axis of rotation can also have more than two wing axes, and the wing axes do not need to be arranged coaxially with respect to one another. It is therefore possible, for instance, to arrange two or more in parallel with one another about rotatable wing axes and to arrange these wing axes rotatably as a group, e.g. by means of a ring mount keeping the wing axes rotatable.

In general, "a", "an", etc. can be understood as singular or plural, in particular in the sense of "at least one" or "one or more", etc., provided this is not explicitly excluded. e.g. by the expression "precisely one", etc.

A numerical value can also include the given value as well as a typical tolerance range, provided this is not explicitly excluded.

The invention claimed is:

1. A household microwave appliance, comprising a rotary antenna including a plurality of wings rotatable about a common axis of rotation, with a relative angle between at least two of the plurality of wings configured to be adjustable about the axis of rotation, wherein a first wing of the plurality of wings is asymmetric relative to the axis of rotation, and in at least one operational position of the rotary antenna, a first portion of the first wing is opposite to no other portion of the first wing relative to the common axis, and in the at least one operational position of the rotary antenna, no portion of a second wing of the plurality of wings is opposite to the first portion of the first wing.

2. The household microwave appliance of claim 1, wherein the at least two wings are rotatable independently of one another.

3. The household microwave appliance of claim 1, wherein the at least two wings are rotatable by wing axes arranged coaxially with respect to one another.

4. The household microwave appliance of claim 1, wherein the at least two wings are rotatable by a same motor via a transmission with an axis-dependent different gear ratio.

5. The household microwave appliance of claim 1, wherein one of the at least two wings includes a stop for another one of the at least two wings.

6. The household microwave appliance of claim 5, wherein the stop is an electrically conductive stop.

7. The household microwave appliance of claim 1, wherein the at least two wings are spaced relative to one another by a distance which is adjustable along the axis of rotation.

8. The household microwave appliance of claim 1, wherein the plurality of wings of rotary antenna is precisely two wings.

9. The household microwave appliance of claim 7, wherein the distance is adjustable by a motor.

10. The household microwave appliance of claim 1, wherein the relative angle between the at least two of the plurality of wings is configured to be adjustable about the axis of rotation by a motor.

11. The household microwave appliance of claim 1, wherein a second wing of the plurality of wings is asymmetric relative to the axis of rotation.

12. The household microwave appliance of claim 1, wherein the first wing has a shape, and the shape is a segment of a circle.

13. A household microwave appliance, comprising a rotary antenna including a plurality of wings rotatable about a common axis of rotation, with a relative angle between at least two of the plurality of wings configured to be adjustable about the axis of rotation; and a rotary ratchet mechanism, wherein the at least two wings are rotatable by wing axes arranged coaxially with respect to one another, and the rotary ratchet mechanism is configured to connect the wing axes of the at least two wings to one another.

14. A household microwave appliance, comprising a rotary antenna including a plurality of wings rotatable about a common axis of rotation, with a relative angle between at least two of the plurality of wings configured to be adjustable about the axis of rotation, wherein the at least two wings are rotatable by wing axes arranged coaxially with respect to one another, and the wing axes have each an electrically conductive section, which is connected to the respective one of the at least two wings, said electrically conductive section projecting into a part of a microwave guide, wherein the at least two wing axes define an outer wing axis and an inner wing axis, with the electrically conductive section of the outer wing axis being embodied as a lateral shield for the electrically conductive section of the inner wing axis, and with the electrically conductive section of the inner wing axis within the microwave guide projecting beyond the electrically conductive section of the outer wing axis.

15. The household microwave appliance of claim 14, wherein a length of a projection of the electrically conducting section of the inner wing axis from the electrically conducting section of the outer wing axis is adjustable by adjusting a distance between the at least two wings along the axis of rotation.

16. A method for operating a household microwave appliance, comprising adjusting a relative angle between at least two wings of a rotary antenna of the household microwave appliance during operation of the household microwave appliance, wherein a first wing of the at least two wings is asymmetric relative to the a common axis of rotation, and in at least one operational position of the rotary antenna, a first portion of the first wing is opposite to no other portion of the first wing relative to the common axis, and in the at least one operational position of the rotary antenna, no portion of a second wing of the at least two wings is opposite to the first portion of the first wing.

17. The method of claim 16, wherein the relative angle is set on the basis of a specification or determination of a product to be treated with microwaves, a distribution of a temperature and/or a degree of browning on a surface of the product to be treated with microwaves, a strength of backscattered microwaves, or a value of one or more operating parameters.

18. The method of claim 16, wherein the relative angle between the at least two wings is adjustable by a motor.

19. The method of claim 16, wherein the second wing is asymmetric relative to the axis of rotation.

20. The method of claim 16, wherein the first wing has a shape, and the shape is a segment of a circle.

* * * * *